United States Patent [19]

Arai et al.

[11] Patent Number: 5,069,929

[45] Date of Patent: Dec. 3, 1991

[54] ACTINIC RADIATION-CURABLE RUST-PREVENTIVE COATING COMPOSITIONS FOR STEEL PRODUCTS

[75] Inventors: Tetsuzo Arai, Takarazuka; Yasushi Yamamoto, Ashiya; Mitsuyuki Raijo, Nara; Isao Fujita, Kobe, all of Japan

[73] Assignees: Sumitomo Metal Industries, Ltd.; Nippon Paint Co., Ltd., both of Osaka, Japan

[21] Appl. No.: 442,384

[22] Filed: Nov. 27, 1989

Related U.S. Application Data

[60] Division of Ser. No. 39,766, Apr. 17, 1987, abandoned, which is a continuation of Ser. No. 652,629, Sep. 20, 1984, abandoned.

[51] Int. Cl.$^5$ .................. B05D 3/06; B65D 33/00; C08L 63/10; C08L 67/07
[52] U.S. Cl. .................. 427/54.1; 427/156; 522/115; 522/95; 522/102; 522/106; 522/171; 526/278; 525/287
[58] Field of Search .......... 522/115; 427/54.1, 156, 427/336, 354

[56] References Cited

U.S. PATENT DOCUMENTS

| | | | |
|---|---|---|---|
| 3,957,918 | 5/1976 | Dickie | 522/115 |
| 3,987,127 | 10/1976 | Dickie | 522/115 |
| 4,228,108 | 10/1980 | Atchison | 204/159.23 |
| 4,438,190 | 3/1984 | Ishimaru | 204/159.23 |

FOREIGN PATENT DOCUMENTS

| | | |
|---|---|---|
| 143830 | 11/1975 | Japan . |
| 110738 | 9/1977 | Japan . |
| 85233 | 7/1979 | Japan . |
| 117569 | 7/1982 | Japan . |
| 172970 | 10/1982 | Japan . |
| 138444 | 8/1984 | Japan . |
| 171646 | 9/1984 | Japan . |

OTHER PUBLICATIONS

Chemical Abstract, vol. 85#48436d Yokomichi, 1976.
Chemical Abstract, vol. 88#106923k Kodama, 1977.
Chemical Abstract, vol. 94#85849x Kansai, 1980.
Chemical Abstract, vol. 95#44162v Somar, 1981.
Fujikawa, Chem, Abstracts, vol. 84:75801e, 1976.

*Primary Examiner*—Marion E. McCamish
*Assistant Examiner*—Arthur H. Koeckert
*Attorney, Agent, or Firm*—Burns, Doane, Swecker & Mathis

[57] ABSTRACT

An actinic radiation-curable, rust-preventive coating composition suitable for use in temporary protection of steel products from rusting and having improved rust preventing property even in the presence of oil on the steel surface is disclosed. The coating composition comprises: (A) from 10 to 50 parts by weight of a vinyl polymer having a glass transition temperature of not lower than 5° C. and a solubility parameter in the range of 9 to 11.5; (B) from 50 to 90 parts by weight of one or more polymerizable compounds having at least one unsaturated group capable of initiating reaction by actinic radiation; and (C) from 0.1 to 20 parts by weight of an organic phosphate of the formula:

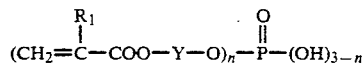

wherein $R_1$ is hydrogen or methyl; Y is a straight or branched chain alkylene having 2 to 20 carbon atoms which may be interrupted by one or more ester or oxy linkages and/or aromatic rings; and n is an integer of 1 to 3.

7 Claims, No Drawings

ACTINIC RADIATION-CURABLE RUST-PREVENTIVE COATING COMPOSITIONS FOR STEEL PRODUCTS

This application is a divisional of application Ser. No. 039,766 filed Apr. 17, 1987, now abandoned, which was a continuation of application Ser. No. 652,629 filed Sept. 20, 1984, now abandoned.

BACKGROUND OF THE INVENTION

This invention relates to an improved rust-preventive coating composition capable of undergoing quick curing by actinic radiation and suitable for use in temporary antirust treatment of steel products, particularly steel tubes and pipes (hereinafter collectively referred to as "steel tubing" or "steel tubes"). It also relates to a steel product having a cured film of such a rust-preventive coating composition on its outer surface.

Various steel tubes including boiler tubes and mechanical tubes as well as other steel products such as sheets, strips, rods, bars, wires, etc. are commonly provided with temporary protective coatings on the outer surfaces thereof throughout the period prior to use in order to eliminate deterioration in quality due to rusting during that period. In the case of tubing, such a temporary protective coating is usually applied in a tube coating line of the tube manufacturing process and removed by the customer prior to use or further processing by appropriate means such as (1) burning-off, (2) physical removal (e.g., shot blasting), or (3) alkaline solution treatment. Rust-preventive coating systems which have heretofore been employed for this purpose include the mineral oil type, the animal or vegetable oil type, and the water-soluble resin type.

These conventional rust preventives involve many disadvantages. For example, mineral oil-type rust preventives provide a coated surface which is permanently sticky because the coatings do not undergo drying or curing. In addition, dripping of the oil from the coated surface may occur during transportation, storage and handling of the coated steel products, resulting in contamination of working environments.

Animal or vegetable oil-type rust preventives such as linseed oil are disadvantageous in that it takes a long time to dry and cure the coatings since the curing generally proceeds via oxidative polymerization in air. Another problem is that this type of rust preventive contains an organic solvent as a viscosity modifier, which evaporates into the surrounding environment to bring about pollution of the environment.

In the case of water-soluble resin-type rust preventives, drying and curing of wet coatings must be effected through time-consuming evaporation of water in a heated zone. As a result, in a high speed coating line of tubes, for example, the coated steel tubes are often passed to a banding and packaging station before the coatings are completely cured. In such cases, the tubes in each package stick to one another in the contact areas and when the customer opens the package and band, the cured films in the contact areas may be peeled off or otherwise damaged. The low drying and curing speed of this type of rust preventive offers another problem in that the rust preventing properties tends to be significantly deteriorated because sagging of uncured coating compositions may readily occur resulting in unevenness of the film thickness, or skid marks may be readily produced while the coated tube is passed over roll skids. As a result, the commercial value of the tubing may be significantly decreased.

In order to overcome the above-mentioned disadvantages of the conventional rust preventives, a method was proposed in Japanese Patent Laid-Open Application No. 142742/1977 wherein a tube is coated on the outer surface thereof with a rust preventive coating composition capable of being cured by actinic radiation such as ultraviolet radiation, an electron beam or the like (such a composition being hereinafter referred to as an "actinic radiation-curable composition") and irradiated with actinic radiation to instantaneously form a cured film. According to such a method using actinic radiation, the rust-preventive coating on the surface of a tube can be completely cured to form a dry film before it contacts the next conveying roll, and therefore the above-mentioned damage to the film caused by contact with rolls or formation of skid marks may be significantly alleviated as compared with the conventional rust preventives. This type of cured film, however, generally cannot be removed by alkali treatment which is a convenient means for removing a temporary coating on steel products.

Japanese Patent Laid-Open Application No. 85233/1979 discloses a method which employs a rust preventive coating composition for metal products comprising 35-95 parts by weight of a mixture of a monofunctional polymerizable compound having one unsaturated group capable of initiating reaction by actinic radiation and a polyfunctional polymerizable compound having two or more such unsaturated groups, with the balance being a copolymer of styrene or its derivative and an unsaturated dicarboxylic acid or its anhydride or ester, preferably a styrene-maleic acid copolymer resin. The coating composition may be applied to a tube and irradiated with actinic radiation to form a cured film. The resulting cured film can be readily removed from the surface of the tube by treatment with a hot alkaline solution prior to use by the customer.

T. Arai et al. in the journal "SUMITOMO METAL", Vol. 35, No. 2, pp. 75-86 (June 1983) discuss various rust-preventive coating compositions for use in temporary protection of steel tubing which are UV radiation-curable and which consist of a base prepolymer, a reactive monomer or oligomer, and a photoinitiator. They particularly discuss the use of a non-reactive film-forming base resin having a carboxylic function such as a styrene-maleic acid copolymer resin of the same type as disclosed in the above Japanese Patent Laid-Open Application No. 85233/1979 in order to render the cured film removable in a hot alkaline solution.

Japanese Patent Laid-Open Application Nos. 110738/1977 and 219272/1984 disclose incorporation of a phosphate ester of a monohydroxyalkyl acrylate or methacrylate in an actinic radiation-curable coating composition in order to enhance the adhesion of the cured film to steel substrate.

Steel tubing frequently bears oil on its surface because various oils or greases are used during processing thereof. For example, in the production of seamless steel tubes, an oil or grease is commonly used in the tube cutting operation to improve efficiency or in the tube straightening step to prevent the straightening rolls from galling. As a result, such oil is inevitably found on the surface of steel tubes and it is usually present as a layer. A naphthenic or paraffinic oil emulsified in water with a surfactant is typically employed for this purpose, although a wide variety of oils are sold on the market.

When one attempts to make a protective coating on a tube which bears oil on its surface by applying thereon an actinic radiation-curable coating composition followed by curing by actinic radiation, it is generally not possible to obtain adequate adhesion or bonding strength between the cured film and the tube for the following reasons:

(1) The setting time of an actinic radiation-curable coating composition is so short that the oil present on the surface of the tube cannot substantially mingle with the coating composition before curing.

(2) Since the cured film is formed almost instantaneously, the stress due to cure shrinkage of the film is also applied instantaneously.

As a result, undesirable phenomena such as "cissing" and "blistering" may be observed on the coated surface.

In order to avoid such adverse effects resulting from the presence of oil on the surface of tubing, in the past it has usually been necessary and the common practice to make the surface as clean as possible prior to coating. Vapor cleaning or alkali degreasing may be employed for this purpose, but incorporation of such a cleaning procedure in the continuous line of tube manufacturing process requires considerable costs for installation and waste water disposal. With a simple degreasing procedure such as physical removal of oil with a wire brush it is difficult to completely remove oil or grease on the steel surface.

T. Arai et al. in the previously mentioned article in "Sumitomo Metal" briefly suggest that a carboxyl-containing non-reactive acrylic resin having a solubility parameter similar to those of mineral oils and a glass transition temperature in a specific range might be employed in place of the styrene-maleic acid copolymer resin as a base resin in order to avoid the loss of adhesion due to the presence of oil on the tube surface. However, the article does not teach any specific numerical limitations on the solubility parameter and glass transition temperature of the resin.

It is well known in the art that it is generally difficult to provide a coating composition having good alkaline removability as well as good adhesion because these properties tend to conflict with each other by nature.

Accordingly, there is still a need for rust-preventive coating compositions suitable for use in temporary protection of steel products which exhibit not only improved adhesion to steel substrates even in the presence of oil but also good alkaline removability

OBJECTS AND SUMMARY OF THE INVENTION

It is an object of the invention to provide an actinic radiation-curable coating composition suitable for use in temporary protection of steel products from rusting which exhibits improved adhesion to steel substrates, the adhesion being not adversely affected by the presence of oil on the surface of the substrate.

It is another object to provide such an actinic radiation-curable coating composition which also exhibits good alkaline removability.

A further object of the invention is to provide steel products such as steel tubing having on the surface thereof a uniform, flaw-free temporary coating which firmly adheres to the steel surface and preferably can be readily removed by treatment with an alkaline solution.

Other objects and advantages of the invention will become apparent to those skilled in the art upon reading the subsequent description.

In one aspect, the present invention provides an actinic radiation-curable, rust-preventive coating composition suitable for use in temporary protection of steel products from rusting and having improved rust preventing properties even in the presence of oil on the steel surface, comprising:

(A) from 10 to 50 parts by weight of a vinyl polymer formed by polymerization of one or more $\alpha,\beta$-ethylenically unsaturated monomers, said vinyl polymer having a glass transition temperature of not lower than 5° C. and a solubility parameter in the range of 9 to 11.5;

(B) from 50 to 90 parts by weight of one or more polymerizable compounds having at least one unsaturated group capable of initiating reaction by actinic radiation; and (C) from 0.1 to 20 parts by weight of one or more organic phosphates of the formula:

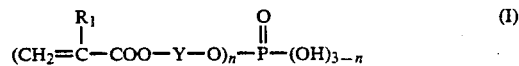

wherein $R_1$ is hydrogen or methyl, Y is a straight or branched chain alkylene having about 2 to about 20 carbon atoms which may be interrupted by one or more ester (—COO—) or oxy (—O—) linkages and/or aromatic rings, and n is an integer from 1 to 3.

In another aspect, there are also provided steel products such as steel tubing having a cured film of such a rust-preventive coating composition on the surface thereof

DETAILED DESCRIPTION OF THE INVENTION

The invention will be described below with respect to preferred embodiments, particularly temporary rust preventing coatings of steel tubing. It should be understood, however, that the coating compositions of the invention can similarly be applied to other steel products including rods, bars, sheets, strips, wires, etc. The steel products may be galvanized ones As mentioned above, the coating compositions comprises. three components: A, B, and C.

Vinyl Polymer (Component A)

The vinyl polymers useful in the coating composition of the invention may be derived from one or more $\alpha,\beta$-ethylenically unsaturated monomers. Examples of these monomers include alkyl acrylates such as methyl acrylate, ethyl acrylate, isopropyl acrylate, n-propyl acrylate, n-butyl acrylate, isobutyl acrylate, 2-ethylhexyl acrylate, n-octyl acrylate, dodecyl acrylate, and lauryl acrylate; alkyl methacrylates such as methyl methacrylate, ethyl methacrylate, isopropyl methacrylate, n-propyl methacrylate, n-butyl methacrylate, isobutyl methacrylate, 2-ethylhexyl methacrylate, n-octyl methacrylate, dodecyl methacrylate, lauryl methacrylate, stearyl methacrylate, and tridecyl methacrylate; adducts of a fatty acid with an acrylate or methacrylate ester having an oxirane ring such as an adduct of stearic acid with glycidyl methacrylate; adducts of an oxirane compound having an alkyl group of eight or more carbon atoms with acrylic or methacrylic acid such as those described in Japanese Patent Publication Nos. 6254/1970 and 38807/1970; styrene, $\alpha$-methylstyrene, o-methylstyrene, m-methylstyrene, p-methylstyrene, p-tert-butylstyrene; benzyl acrylate, and benzyl methacrylate; itaconate esters such as dimethyl itaconate; maleate esters such as dimethyl maleate; fumarate esters such as dimethyl fumarate; acrylonitrile, methacrylonitrile; vinyl acetate; hydroxyethyl acrylate, hydroxypropyl acrylate, hydroxybutyl acrylate, hydroxymethyl methacrylate, hydroxyethyl methacrylate, hydroxypropyl methacrylate, hydroxybutyl methacrylate; N-methylolacrylamide; allyl alcohol; and the like.

Also useful for the preparation of the vinyl polymers are α,β-ethylenically unsaturated monomers which contain one or more carboxyl groups, such as acrylic acid, methacrylic acid, crotonic acid, ethacrylic acid, propylacrylic acid, itaconic acid, maleic anhydride, fumaric acid and the like.

The vinyl polymers used in the present invention may be prepared from one or more monomers as above by subjecting them to polymerization in a conventional manner. For instance, one or more monomers are mixed with an initiator known per se (e.g., azoisobutyronitrile), added dropwise to a reaction vessel containing a solvent heated to a temperature sufficient to effect polymerization, and then aged to complete the polymerization. The resulting vinyl polymer will contain the solvent. The presence of a substantial amount of a solvent may adversely affect the curing of the coating composition of the present invention which contains an actinic radiation-curable compound (Component B). However, if the amount of the solvent is as small as 2% or less based on the weight of the coating composition, it will offer no appreciable problem. Therefore, if the vinyl polymer is prepared by the conventional solution polymerization method, it is generally desirable that the solvent be removed from the reaction mixture, for example, by distilling off in vacuo, and displaced by another solvent that is a polymerizable compound having an unsaturated group capable of undergoing polymerization by actinic radiation (e.g., an alkyl acrylate or methacrylate as mentioned above) prior to use to prepare the coating composition.

The vinyl polymer must have a glass transition temperature of not lower than 5° C. and preferably not lower than 25° C. If the glass transition temperature of the vinyl polymer is lower than about 5° C., water may readily permeate and diffuse into the cured film of the resulting coating composition, thereby deteriorating the rust preventing property of the film.

When the vinyl polymer is a copolymer of two or more monomers, the glass transition temperature of the copolymer may be determined by the following equation according to T. G. Fox, Bull. Am. Phys. Soc., 1, (3) 123 (1956):

$$1/Tg = \Sigma W_n/Tg_n$$

where Tg is the glass transition temperature of the copolymer, $W_n$ is the weight fraction of monomer n, and $Tg_n$ is the glass transition temperature of homopolymer of monomer n.

It is also critical that the vinyl polymer used in the present invention have a solubility parameter in the range of from 9 to 11.5, preferably in the range of from 9.5 to 11.0. If this value is less than about 9, it is difficult to obtain a homogeneous coating composition because its compatibility with the polymerizable compound (Component B) becomes poor. On the other hand, the use of a vinyl polymer having a solubility parameter exceeding about 11.5 may result in the formation of a coating composition the adhesion of which to oil-bearing steel substrates is markedly decreased to such an extent that the desired rust preventing property is no longer achievable.

The solubility parameter of the vinyl polymer may be determined according to the method described in J. Appl. Polym. Sci., 12, 2359 (1968).

It is preferred that the vinyl polymer used in the present invention have a number-average molecular weight in the range of about 3,000 to about 30,000. If the molecular weight is less than about 3,000, the resulting cured film will not have satisfactory strength. A vinyl polymer having a molecular weight of more than about 30,000 will give a coating composition which has a viscosity so increased that it will be difficult to apply in a conventional manner.

Also it is preferred that the vinyl polymer be a copolymer of two or more α,β-ethylenically unsaturated monomers.

As previously mentioned, a steel tube having a temporary rust-preventive coating on its surface is subjected to treatment to remove the temporary coating at the customer's yard prior to use. When the coating is to be removed by treatment with an alkaline solution, the vinyl polymer preferably has an acid value in a particular range Thus, in such cases, it is preferable to use a vinyl polymer which comprises recurring units derived from an α,β-ethylenically unsaturated monomer containing one or more carboxyl groups, and such carboxyl-containing monomer should be present in the vinyl polymer in such an amount that the resulting copolymer has an acid value in the range of from about 30 to about 120 on a solids basis. It has been found that the incorporation of such an acidic comonomer in the vinyl polymer and hence in the coating composition does not adversely affect the adhesion of the cured film formed from the coating composition to a substantial extent.

Preferable monomers for use in the preparation of the vinyl polymer are alkyl acrylates and methacrylates, acrylic and methacrylic acids, and styrene and its derivatives

Polymerizable Compound (Component B)

Component B is composed of one or more polymerizable compounds having at least one unsaturated group such as an acryl, methacryl, or vinyl group capable of initiating reaction (i.e., polymerization or cross-linking) by actinic radiation such as UV radiation, an electron beam, or γ-rays. The polymerizable compounds may be monomeric, oligomeric, or polymeric as long as they have at least one unsaturated group as defined above.

Particularly useful in the present invention are those polymerizable compounds having at least two unsaturated groups (such compounds being referred to hereinafter as "polyfunctional compounds"), which include:

(a) a polyester acrylate or methacrylate which is the reaction product of (i) 1 mole of a hydroxyl-containing polyester formed by the reaction of a polyacid or its anhydride (e.g., succinic acid, adipic acid, o-phthalic acid, tetrahydrophthalic acid, or hexahydrophthalic acid) and a stoichiometrically excess amount of polyhydric alcohol (e.g., ethylene glycol, propylene glycol, trimethylol propane, or pentaerythritol) and (ii) at least 2 moles of acrylic or methacrylic acid or a carboxyl-containing acrylic or methacrylic acid derivative (e.g., the reaction product of 1 mole of succinic anhydride and 1 mole of 2-hydroxyethyl acrylate, or the reaction product of 1 mole of phthalic anhydride and 1 mole of 2-hydroxyethyl acrylate);

(b) a polyester acrylate or methacrylate which is the reaction product of (i) 1 mole of a carboxyl-containing polyester formed by reaction of a polyhydric alcohol as mentioned above and a stoichiometrically excess amount of a polyacid or its anhydride as mentioned above and (ii) at least 2 moles of a monohydroxyl-containing acrylic or methacrylic acid derivative (e.g., 2-hydroxyethyl acrylate or 2-hydroxyethyl methacrylate) or an epoxy-containing acrylic or methacrylic acid derivative (e.g., glycidyl acrylate or glycidyl methacrylate);

(c) a polyurethane acrylate or methacrylate obtained by the addition of a monohydroxyl-containing acrylic or methacrylic acid derivative as mentioned above to an adduct of a hydroxy compound (e.g., ethylene glycol, polyethylene glycol, propylene glycol, polypropylene glycol, trimethylol propane, a hydroxyl-containing polyester as mentioned in (a) above) with a stoichiometrically excess amount of a polyisocyanate (e.g., tolylene diisocyanate, xylylene diisocyanate, isophorone diisocyanate, hexamethylene diisocyanate, the reaction product of 1 mole of trimethylolpropane and 3 moles of tolylene diisocyanate) in a proportion of at least 2 molecules of the monohydroxyl-containing acrylic or methacrylic acid derivative per each residual isocyanate radical of the adduct;

(d) an epoxy acrylate or methacrylate obtained by the addition of at least 2 moles of acrylic or methacrylic acid or a carboxyl-containing acrylic or methacrylic acid derivative as mentioned above to 1 mole of an epoxy compound (e.g., a polycondensate of epichlorohydrin and bisphenol-A); and (e) a monomeric or oligomeric polyfunctional compound such as 1,6-hexanediol diacrylate, neopentylglycol diacrylate, 1,10-decanediol diacrylate, trimethylolpropane triacrylate, pentaerythritol tetraacrylate, dipentaerythritol hexaacrylate, 1,6-hexanediol dimethacrylate, neopentylglycol dimethacrylate, 1,10-decanediol dimethacrylate, trimethylolpropane trimethacrylate, pentaerythritol tetramethacrylate, dipentaerythritol hexamethacrylate, ethylene glycol diacrylate, diethylene glycol diacrylate, ethylene glycol dimethacrylate, diethylene glycol dimethacrylate, dipropylene glycol diacrylate, dipropylene glycol dimethacrylate, triethylene glycol diacrylate, triethylene glycol dimethacrylate, tripropylene glycol diacrylate, tripropylene glycol dimethacrylate, polyethylene glycol diacrylate, polyethylene glycol dimethacrylate, polypropylene glycol diacrylate, polypropylene glycol dimethacrylate, or the like.

Another class of the polymerizable compound is a monofunctional polymerizable compound having one unsaturated group capable of initiating reaction by actinic radiation. The monofunctional polymerizable compound includes alkyl acrylates or methacrylates, hydroxyalkyl or alkoxyalkyl acrylates or methacrylates, styrene and alkyl-substituted styrene derivatives, di-, tri- or polyethylene glycol monoalkyl ether acrylates or methacrylates, di-, tri- or polypropylene glycol monoalkyl ether acrylates or methacrylates, dicycloalkenyl acrylates and methacrylates (e.g., dicyclopentenyl acrylate), tetrahydrofurfuryl acrylate and methacrylate, and the like.

According to the present invention, Component B of the coating composition may consist essentially of one or more of the above polyfunctional compounds. It is preferred, however, that the polyfunctional compounds be combined with one or more monofunctional polymerizable compounds, because cured films of the resulting coating composition have well-balanced improved properties with respect to adhesion to steel substrates and strength of the films. Alternatively, Component B may consist essentially of one or more monofunctional compounds.

If it is desired that the cured film formed from the coating composition of the present invention have removability in an alkaline solution, a carboxyl-containing polyfunctional compound (for example, a compound obtained by the addition of an acid anhydride such as phthalic anhydride to an epoxy acrylate as mentioned in (d) above) or a carboxyl-containing monofunctional compound (for example, an adduct of 2-hydroxyethyl acrylate with an acid anhydride such as tetrahydrophthalic anhydride) should be present in Component B. Alternatively, as mentioned previously, removability in an alkaline solution may be attained by incorporating a carboxyl-containing monomer in the preparation of the vinyl polymer (Component A) so as to give an acid value in a specific range.

Organic Phosphate Ester (Component C)

A third component of the coating composition of the invention is at least one organic phosphate ester having at least one unsaturated group capable of initiating reaction by actinic radiation, said phosphate ester being represented by the formula:

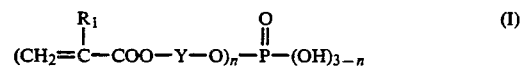

wherein $R_1$ is hydrogen or methyl, Y is a straight or branched chain alkylene having about 2 to about 20 carbon atoms which may be interrupted by one or more ester (—COO—) or oxy (—O—) linkages or aromatic rings, and n is an integer from 1 to 3.

Examples of the phosphate esters of the above formula include 2-acryloyloxyethyl phosphate, a compound of the above formula wherein $R_1$ is H, Y is ethylene, and n is 1 which is prepared from 2-hydroxyethyl acrylate and phosphoric acid; 2-acryloyloxypropyl phosphate, a compound of the above formula wherein $R_1$ is H, Y is —CH(CH$_3$)CH$_2$—, and n is 1 which is prepared from 2-hydroxypropyl acrylate and phosphoric acid; 2-acryloyloxyethoxycarbonylpentyl phosphate, a compound of the above formula wherein $R_1$ is H, Y is —C$_2$H$_4$—OCO—C$_5$H$_{10}$— and n is 1 which is prepared from 2-hydroxyethyl acrylate, $\epsilon$-caprolactone, and phosphoric acid; and the like. Another class of the phosphates are those of Formula (I) in which the alkylene group for Y is interrupted by oxy linkages. Such phosphates may be obtained by the reaction of phosphoric acid with an unsaturated monocarboxylic acid (e.g., acrylic or methacrylic acid) and a monoepoxy compound such as an alkyl or aryl glycidyl ether (e.g., phenyl glycidyl ether or butyl glycidyl ether).

These organic phosphate esters may be usually prepared by reacting a phosphorus oxide (e.g., phosphorus pentoxide) with a hydroxyl-containing acrylate or methacrylate (e.g., 2-hydroxylethyl acrylate) or its precursor (e.g., a combination of acrylic acid and an alkyl glycidyl ether) and other reactants (e.g., $\epsilon$-caprolactone), if any, at an elevated temperature (e.g., 40°–80° C.) with stirring.

Preferably an organic phosphate of Formula (I) having a longer alkylene chain for Y is employed, since such a phosphate tends to give an improved compatibility with the vinyl polymer, leading to improved film properties. The alkylene group Y preferably has about six or more carbon atoms from this point of view. The use of an organic phosphate having a longer alkylene chain is particularly advantageous when the vinyl polymer has a lower solubility parameter. Thus, the type and amount of the organic phosphate to be employed may be selected depending on the properties of the vinyl polymer (i.e., solubility parameter and glass transition temperature) and the amount of oil on the steel surface. One or more organic phosphates of Formula (I) may be present in the coating composition of the present invention.

As previously mentioned, the coating compositions of the present invention comprise from 10 to 50 parts by weight of Component A, from 50 to 90 parts by weight of Component B, and from 0.1 to 20 parts by weight of Component C. Preferably, the coating compositions comprise from 10 to 30 parts by weight of Component A, from 70 to 90 parts by weight of Component B, and from 1 to 10 parts by weight of Component C.

If less than 10 parts by weight of Component A or more than 90 parts by weight of Component B are present, then the resulting coating composition will possess a decreased adhesion to oil-bearing steel tubes. The presence of more than 50 parts by weight of Component A or less than 50 parts by weight of Component B will tend to form a coating composition having a viscosity so increased that the coating composition will be difficult to apply by a conventional coating method. The addition of less than 0.1 part by weight of the organic phosphate ester (Component C) is not sufficient to give a coating composition having improved adhesion properties, particularly with respect to adhesion to an oil-bearing steel surface after exposure to a corrosive environment or after prolonged outdoor exposure, while if the amount of Component C exceeds 20 parts by weight the resulting coating composition will not form a cured film having improved corrosion resistance or rust preventing properties.

In addition to the above-mentioned three essential components, the coating compositions according to the present invention may optionally contain photoinitiators, pigments, and other additives. A photoinitiator should be present if the actinic radiation employed for curing is ultraviolet radiation. Examples of the photoinitiator are benzoin, benzoin methyl ether, benzoin ethyl ether, benzoin isopropyl ether, benzoin isobutyl ether, benzil, benzophenone, 2,2'-diethoxyacetophenone, 2-methylanthraquinone, 2-ethylanthraquinone, etc. One or more of these photoinitiators may be added, preferably in a total amount of about 0.1 to 10% by weight based on the weight of the polymerizable compound (Component B) in the coating composition.

The coating compositions of the present invention may be applied to steel tubing and other steel products by any suitable coating method such as brushing or spraying. Alternatively, the coating method disclosed in Japanese Patent Laid-Open Application No. 56068/1982 may be employed. Immediately after application of the coating composition, the coated steel product is irradiated with actinic radiation generated by an appropriate source such as a medium pressure, high pressure or ultrahigh pressure mercury lamp or metal halide lamp (these generating UV radiation), an electron beam accelerator, or a γ-ray source such as cobalt-60, resulting in substantially spontaneous curing of the coating composition.

The thus formed cured film of the coating composition of the present invention exhibits significantly improved adhesion to the steel substrate even should the substrate bear oil or grease on the surface thereof. The improved adhesion is maintained after exposure to corrosive conditions or after outdoor exposure for a prolonged period.

As mentioned previously, in a preferred embodiment, the coating composition may be provided with removability of the cured film in an alkaline solution by incorporating a carboxyl-containing constituent in Component A and/or B, preferably as a comonomer of the vinyl polymer (Component A) in a sufficient amount to provide an acid value of the vinyl polymer in the range of about 30 to about 120. It is surprising that the provision of alkaline removability in the above-mentioned manner does not cause any substantial decrease in adhesion of cured films. Thus, the cured films still retain the improved adhesion and rust preventing properties even in the presence of oil on the substrates and after exposure to corrosive conditions or after outdoor exposure for a prolonged period, and they can nevertheless be readily removed by treatment with an alkaline solution.

The following examples are presented to illustrate the claimed invention. It should be understood, however, that the invention is not limited to the specific details set forth in the examples. All the percents and parts are by weight unless otherwise specified.

Preparations 1–8

Preparation of vinyl polymers

To a 1 liter separable flask equipped with a reflux condenser, dropping funnel, thermometer and agitating blade, 380 g of toluene was added and heated to 110° C. While the contents of the flask were stirred at that temperature, a solution consisting of 120 g of ethyl acrylate, 280 g of methyl methacrylate, and 8 g of "Perbutyl-O" (tradename, an organic peroxide manufactured by Nippon Oils & Fats Co., Ltd.) was added dropwise at a constant rate over 3 hours and the mixture was then stirred for 30 minutes. A solution of 2.8 g of Perbutyl-O in 20 g of toluene was subsequently added dropwise at a constant rate over 30 minutes and the stirring was continued for another hour. The reaction mixture was then heated at atmospheric pressure whereby toluene was distilled off. After the temperature of the contents reached 130° C., toluene was further distilled off at that temperature to recover 300 g of toluene by this time. The contents of the flask were then allowed to cool. After the temperature reached 90° C., 0.51 g of hydroquinone and 205.4 g of Carbitol acrylate (tradename, diethylene glycol monoethyl ether acrylate sold by Union Carbide) were added and toluene was distilled off in vacuo at 90° C. and 8 mmHg for 30 minutes to recover an additional 80 g of toluene. The resulting resin composition contained the vinyl polymer at a concentration of 64.5%, the balance consisting essentially of Carbitol acrylate.

In the same manner as above, various vinyl polymers were prepared as resin compositions in Carbitol acrylate The initiator added initially and secondly was Perbutyl-O in every preparation. The monomers used and their amounts (parts by weight) as well as the amounts of the initiator added initially and secondly are summarized in Table 1 below together with properties of the resulting vinyl polymers. The vinyl polymers obtained in Preparations 6 to 8 are comparable ones because either the glass transition temperatures or the solubility parameters of these polymers are outside the range defined according to the invention.

TABLE 1

| No. | Monomers (Parts in parentheses) | | Initiator (Parts) | | Properties of vinyl polymer** | | | | |
|---|---|---|---|---|---|---|---|---|---|
| | | | Initial | Second | Tg | S.P. | A.V. | M.W. | Solids (%) |
| 1 | Ethyl acrylate | (120) | 8 | 2.8 | 55 | 10.7 | 0 | 8,300 | 64.5 |
| | Methyl Methacrylate | (280) | | | | | | | |
| | Methyl methacrylate | (232) | | | | | | | |
| 2 | Ethyl acrylate | (128) | 20 | 4 | 30 | 10.4 | 0 | 5,500 | 65.1 |
| | Lauryl methacrylate | (40) | | | | | | | |
| | n-Butyl methacrylate | (208.4) | | | | | | | |
| 3 | Styrene | (39.2) | 4 | 2 | 55 | 9.8 | 0 | 12,300 | 62.1 |
| | Methyl methacrylate | (152.4) | | | | | | | |
| | n-Butyl methacrylate | (157) | | | | | | | |
| 4 | Styrene | (196.8) | 12 | 3.2 | 55 | 10.8 | 90 | 7,600 | 64.3 |
| | Acrylic acid | (46.2) | | | | | | | |
| | n-Butyl methacrylate | (95.2) | | | | | | | |
| 5 | n-Butyl acrylate | (92.8) | 4 | 2 | 55 | 10.3 | 60 | 15,000 | 61.2 |
| | Styrene | (181.2) | | | | | | | |
| | Acrylic acid | (30.8) | | | | | | | |
| 6 | Ethyl acrylate | (220) | 12 | 3.2 | −6* | 10.0 | 0 | 7,200 | 64.0 |
| | n-Butyl methacrylate | (180) | | | | | | | |
| | Methyl methacrylate | (157) | | | | | | | |
| 7 | Ethyl methacrylate | (196.8) | 12 | 3.2 | 82.3 | 12.0* | 90 | 8,000 | 60.9 |
| | Acrylic acid | (46.2) | | | | | | | |
| | Styrene | (200) | | | | | | | |
| 8 | 2-Ethylhexyl methacrylate | (160) | 12 | 3.2 | 25.2 | 8.7* | 0 | 7,800 | 64.8 |
| | 2-Ethylhexyl acrylate | (40) | | | | | | | |

(Note)
*Outside this invention;
**Tg: Glass transition temperature (°C.); S.P.: Solubility parameter; A.V.: Acid value; M.W.: Number-average molecular weight.

Preparation 9

Preparation of 2-Acryloyloxyethyl Phosphate

To a flask equipped with a stirrer, 371 parts of 2-hydroxyethyl acrylate and 1 part of hydroquinone were added and heated to 50° C. Under stirring at that temperature, 142 parts of phosphorus pentoxide were added over 1 hour and the mixture was then heated at 70° C. for 2 hours to form the desired phosphate ester as a clear brown liquid having an acid value of 344.

In essentially the same manner as above, another phosphate ester may be prepared from 2-hydroxyethyl acrylate, ε-caprolactone and phosphorus pentoxide to give 2-acryloyloxyethoxycarbonylpentyl phosphate.

EXAMPLE 1

Using each vinyl polymer-containing resin composition obtained in Preparations 1-8 and the phosphate ester obtained in Preparation 9, a coating composition was prepared by mixing and agitating the ingredients at room temperature according to the following formulation:

| Formulation: |
|---|
| 40 Parts of vinyl polymer-containing resin composition (60.9%–65.1% solids) |
| 20 Parts of trimethylolpropane triacrylate |
| 16 Parts of Ripoxy VR-80 (tradename, an epoxy acrylate obtained by the addition of 2 moles of acrylic acid to 1 mole of polycondensate of epichlorohydrin and bisphenol-A, manufactured by Showa High Polymer Co., Ltd.) |
| 18 Parts of Carbitol acrylate |
| 2 Parts of 2-acryloyloxyethyl phosphate (Preparation 9) |
| 4 Parts of benzoin isopropyl ether (photoinitiator) |
| Total 100 Parts |

| -continued |
|---|
| Formulation: |

Separately, cold rolled carbon steel sheets (JIS G 3141) which had been degreased with xylene were dipped in a solution consisting of 2 parts of mineral oil (spindle oil) and 98 parts of acetone at room temperature, then removed from the solution and allowed to stand in a room for about 10 minutes to prepare black sheets bearing mineral oil uniformly distributed on the surface.

The black sheets were coated with the coating compositions prepared above with a #18 bar coater to a thickness of 15±3 microns on a dry basis and immediately irradiated with UV radiation by passing beneath a 2 KW medium pressure mercury lamp (80 W/cm energy power equipped with a focusing-type reflector, manufactured by Japan Storage Battery, Co., Ltd.) at a travelling speed of 6 m/min in the direction perpendicular to the longitudinal axis of the lamp at a distance of 8 cm from the lower end of the reflector, causing the coatings to be cured.

Each resulting coated steel sheet was visually inspected for damage to the cured film and also subjected to tests to evaluate film properties, i.e., primary adhesion, corrosion resistance, and secondary adhesion in the manner outlined below. The results are summarized in Table 2 below.

Appearance: The cured film was visually observed to check for anomalies in appearance or damage such as cissing, blisters or recesses and evaluated by being given one of the following three ratings:
  ○: Good (Substantially no damage)
  Δ: Moderate (Slight damage)
  X : Poor (Significant damage).

Primary adhesion: After the film was cross cut at a distance of 1 mm to form one hundred 1mm squares, it was subjected to a peel test with an adhesive tape. The number of squares of the film remaining on the substrate after peeling was counted and evaluated as follows:
○: 80% or more squares remain;
Δ: 50 to 79% squares remain;
X : less than 50% squares remain.

Corrosion resistance: The film with no cross cuts was subjected to a salt spray test (JIS Z 2371, aqueous 5% NaCl mist at 35° C.) for 72 hours. The results were evaluated by measuring the percent area covered with rust.

Secondary adhesion: According to JIS K 5400, the film with diagonal cuts to a depth reaching the substrate was exposed to a salt spray mist under the same conditions as above for 72 hours and then subjected to a tape peel test. The results were evaluated by measuring the width of the film removed by the adhesive tape on one side of the cross cut or in other words the rust intrusion distance from the cross cut edge.

Outdoor exposure test: The film with diagonal cuts in the same manner as in the secondary adhesion test was subjected to outdoor exposure for 6 months The results were evaluated by measuring the width of the rust on one side of the cross cut. This test is effective for estimating the adhesion under practical conditions. It has been found that there is a correlation between the results of the secondary adhesion test and the outdoor exposure test.

The formulations and the test results are summarized in Table 3 below. The Run Nos. 9 and 10 of this example are the same as Run Nos. 1 and 5, respectively, of Example 1.

TABLE 3

| Run No. | Comparative | | | | | This invention | | | | | |
|---|---|---|---|---|---|---|---|---|---|---|---|
| | 1 | 2 | 3 | 4 | 5 | 6 | 7 | 8 | 9 | 10 | 11 |
| Formulation (Parts) | | | | | | | | | | | |
| Vinyl polymer*** | | | | | | | | | | | |
| Preparation 1 (64.5% solids) | 40 (25.8) | — | — | 15 (9.7) | 80 (51.6) | — | 40 (25.8) | 40 (25.8) | 40 (25.8) | — | — |
| Preparation 3 (62.1% solids) | — | — | — | — | — | 40 (24.8) | — | — | — | — | — |
| Preparation 5 (61.2% solids) | — | — | — | — | — | — | — | — | — | 40 (24.5) | 60 (37.3) |
| Trimethylolpropane triacrylate | 20 | 40 | 40 | 35 | 14 | 20 | 20 | 20 | 20 | 20 | 10 |
| Ripoxy VR-80 | 16 | 26 | 26 | 26 | — | 16 | 16 | 16 | 16 | 16 | 6 |
| Carbitol acrylate | 20 | 30 | 28 | 18 | — | 18 | 19.9 | — | 18 | 18 | 18 |
| 2-Acryloyloxyethyl phosphate | — | — | 2 | 2 | 2 | — | 0.1 | 20 | 2 | 2 | 2 |
| 2-AEPP (phosphate)* | — | — | — | — | — | 2 | — | — | — | — | — |
| Benzoin isopropyl ether | 4 | 4 | 4 | 4 | 4 | 4 | 4 | 4 | 4 | 4 | 4 |
| Properties | | | | | | | | | | | |
| Appearance | ○ | X | X | Δ | —** | ○ | ○ | ○ | ○ | ○ | ○ |
| Primary adhesion | ○ | X | X | Δ | —** | ○ | ○ | ○ | ○ | ○ | ○ |
| Corrosion resistance (%) | 1 | 50 | 70 | 15 | —** | 1 | 1 | 3 | 1 | 5 | 6 |
| Secondary adhesion (mm) | >15 | >15 | >15 | 8 | —** | 2 | 5 | 5 | 3 | 4 | 5 |
| Outdoor weatherability (mm) | 8 | 15 | 12 | 9 | —** | 3 | 6 | 6 | 3.5 | 5 | 5 |

*2-Acryloyloxyethoxycarbonylpentyl phosphate prepared from 2-hydroxyethyl acrylate, ε-caprolactone and phosphoric acid.
**The coating composition could not be applied.
***Parts of resin composition; Parts of vinyl polymer solids in parentheses.

TABLE 2

| Run No. | Vinyl Polymer Preparation No. | Appearance | Primary Adhesion | Corrosion Resistance (%) | Secondary Adhesion (mm) |
|---|---|---|---|---|---|
| 1 | 1 | ○ | ○ | 1 | 3 |
| 2 | 2 | ○ | ○ | 1 | 3 |
| 3 | 3 | ○ | ○ | 1 | 3 |
| 4 | 4 | ○ | ○ | 10 | 5 |
| 5 | 5 | ○ | ○ | 5 | 4 |
| 6* | 6 | ○ | ○ | 30 | 8 |
| 7* | 7 | ○ | X | 50 | >15 |
| 8* | 8 | —** | —** | —** | —** |

*Comparative examples;
**A homogenous solution could not be formed due to separation of the vinyl resin from the other ingredients, so the composition could not be tested.

EXAMPLE 2

Following the procedure described in Example 1, various coating compositions having formulations which did or did not fall within the scope defined herein were prepared, applied to oil-bearing cold rolled carbon steel sheets treated in the same manner as Example 1, cured, and then subjected to the same tests The outdoor weathering properties of the cured films were also determined by an outdoor exposure test outlined below

EXAMPLE 3

The coating compositions of Run Nos. 1 and 5 of Example 1 and Run Nos. 1 to 3 of Example 2 were applied in a thickness of 15±3 microns (on a dry basis) to steel tubes of 57 mm in outer diameter and 3 mm in wall thickness which had undergone straightening using "Daicool UL-26", a mineral oil-type lubricative coolant manufactured by Daido Kagaku Kogyo K.K. Immediately thereafter each coated steel tube was irradiated with UV radiation uniformly for 1.5 seconds by means of 2 KW medium pressure mercury lamps (equipped with a focusing-type reflector, manufactured by Japan Storage Battery Co., Ltd.) positioned at a distance of 8 cm from the tube surface. The appearance and the film properties of the coated steel tube were evaluated in the same manner as in Example 1 and the results are summarized in Table 4 below.

TABLE 4

| Formulation | Resin | Appearance | Primary adhesion | Corrosion resistance (%) | Secondary adhesion (mm) |
|---|---|---|---|---|---|
| Example 1 | | | | | |
| Run No. 1 | Prep. 1 | ○ | ○ | 1 | 4 |
| Run No. 5 | Prep. 5 | ○ | ○ | 5 | 7 |
| Example 2* | | | | | |
| Run No. 1* | Prep. 1 | ○ | ○ | 1 | >15 |
| Run No. 2* | — | X | X | 50 | >15 |

TABLE 4-continued

| Formulation | Resin | Appearance | Primary adhesion | Corrosion resistance (%) | Secondary adhesion (mm) |
|---|---|---|---|---|---|
| Run No. 3* | — | X | X | 70 | >15 |

*Comparative example.

EXAMPLE 4

The cured films obtained in Run Nos. 10 and 11 of Example 2 were evaluated for alkaline removability. The test was conducted by immersing a specimen with a cured film in an aqueous 5% sodium hydroxide solution at 75-80° C. and measuring the time required to cause the film to peel off from the steel surface as an indication of alkaline removability. The cured films of Run No. 10 of Example 2 peeled off after 5 minutes in the hot alkali solution, while that of Run No. 11 of Example 2 peeled off within 3 minutes therein.

As can be seen from the data in the above tables, all the coating compositions according to the present invention gave satisfactory results both in adhesion (primary and secondary as well as long term weathering properties) and in rust preventing properties, despite the use of oil-bearing steel specimens. In contrast, the comparative coating compositions were not successful in respect of at least one of these properties or otherwise could not form a uniform composition adoptable to coating. Particularly, all the comparative compositions showed inferior adhesion of the cured films after exposure to corrosive conditions or after long-term outdoor exposure as compared to those of this invention. This indicates that the comparative coating compositions are of less practical value because the results of secondary adhesion and weatherability can be used to estimate the film properties under practical conditions. It was surprisingly demonstrated that the coating compositions of Run Nos. 10 and 11 of Example 2 provided good alkaline removability (Example 4) and nevertheless showed improved adhesion (Table 3).

Although the invention has been described with preferred embodiments, it is to be understood that variations and modifications may be employed without departing from the concept of the invention as defined in the following claims.

what is claimed is:

1. A process for temporarily preventing a steel product from rusting by providing said steel product with an ultraviolet radiation-curable, rust-preventive coating composition which is alkaline solution removable, comprising the steps of:

providing a coating composition consisting essentially of:
 (A) from 10 to 50 parts by weight of a vinyl polymer formed by polymerization of one or more $\alpha,\beta$-ethylenically unsaturated monomers selected from the group consisting of alkyl acrylates and methacrylates, acrylic and methacrylic acid, and styrene and its derivatives, said vinyl polymer having a glass transition temperature of not lower than 5° C., a solubility parameter in the range of from 9 to 11.5, and a number average molecular weight in the range of from 3,000 to 30,000;
 (B) from 50 to 90 parts by weight of one or more polymerizable compounds having at least one unsaturated group capable of initiating reaction by ultraviolet radiation in the presence of a photoinitiator;
 (C) from 0.1 to 20 parts by weight of one or more organic phosphates of the formula:

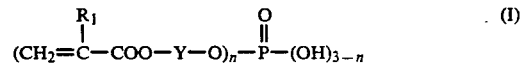

$$(CH_2=\overset{R_1}{\underset{|}{C}}-COO-Y-O)_n-\overset{O}{\underset{\|}{P}}-(OH)_{3-n} \qquad (I)$$

wherein $R_1$ is hydrogen or methyl, Y is a straight or branched chain alkylene having about 2 to about 20 carbon atoms which may be interrupted by one or more ester or oxy linages and/or aromatic rings, and n is an integer from 1 to 3; and
 (D) one or more photoinitiators provided in an amount of from 0.1% to 10% by weight based on the total weight of the polymerizable compounds (B);
wherein at least one of said one or more $\alpha,\beta$-ethylenically unsaturated monomers is a carboxyl-containing one which is present in such an amount that the resulting vinyl polymer (A) has an acid value in the range of from 30 to 120 on a solids basis, and wherein said one or more organic phosphates of (C) are different from said one or more polymerizable compounds of (B);

applying said coating composition to at least one surface of said steel product;

exposing the coating composition consisting essentially of components (A), (B), (C) and (D) to ultraviolet radiation, thereby forming a cured, rust-preventive coating composition removably adhered to said steel product; and thereafter removing said cured coating composition by treating it with an alkaline solution.

2. The method of claim 1 wherein said coating composition further comprises a vinyl polymer having a glass transition temperature of not lower than 25° C. and a solubility parameter in the range from about 9.5 to 11.0.

3. The method of claim 1 wherein said coating composition further comprises one or more polymerizable compounds and wherein said polymerizable compounds comprise a mixture of at least one monofunctional compound having one unsaturated group and at least one polyfunctional compound having two or more unsaturated groups.

4. The method of claim 1 wherein said coating composition further comprises, as Component (C), at least one organic phosphate of Formula (I), where $R_1$, Y and n are as defined in claim 1 except that said straight or branched chain alkylene for Y has at least 6 carbon atoms.

5. The method of claim 1 wherein said coating composition further comprises from 10 to 30 parts by weight of said vinyl polymer, from 70 to 90 parts by weight of said one or more polymerizable compounds and from 1 to 10 parts by weight of said one or more organic phosphate.

6. The method of claim 1 wherein said steel product is a tube.

7. The method of claim 6 wherein said coating composition is applied to an outer surface of said tube.

* * * * *